United States Patent Office 3,215,734
Patented Nov. 2, 1965

3,215,734
PROCESS FOR PURIFICATION OF
TEREPHTHALIC ACID
Ewald Katzschmann, Dortmund-Kruckel, Germany, assignor to Chemische Werke Witten G.m.b.H., Witten (Ruhr), Germany
No Drawing. Filed June 14, 1961, Ser. No. 116,989
Claims priority, application Germany, June 18, 1960, C 21,706
7 Claims. (Cl. 260—525)

The present invention relates to a process for the purification of aromatic carboxylic acids, and more particularly to a process for the purification of phthalic acids, especially terephthalic acid.

Pure aromatic carboxylic acids, especially aromatic di- and polycarboxylic acids are required by the chemical industry in ever increasing quantities. Of particular importance are terephthalic and isophthalic acids, especially for use in the manufacture of synthetic resins. These acids are, however, very difficult to obtain in pure form since in the manufacture thereof isomeric impurities are produced which, due to the physical and chemical properties thereof render known purification and separation processes such as re-crystallization, distillation, and sublimation unusable. The aforementioned acids when made by oxidation of the corresponding alkyl aromatic substances with nitric acids also contain, aside from isomeric impurities, nitrogen compounds which are extremely difficult to remove.

According to known methods, it is, however, possible to separate and purify tere-and-isophthalic acids by way of the dimethyl esters thereof. After several re-crystallizations and/or distillations very pure dimethyl esters are obtained. However, if the free acids are required, the esters must be saponified after the purification thereof. Therefore, while the aforementioned process leads to the desired result, it is completely uneconomical. For this reason, the industry has for some time been attempting to develop better purification and separation processes for the phthalic acids.

For example, it has been proposed to separate terephthalic acids and p-toluic acid mixtures by extraction with boiling acetonitrile. This method, however, presupposes that the terephthalic acid does not contain any impurities which are soluble in acetonitrile. Similar prerequisites are also present with all other known methods which are based on the extraction with a solvent medium.

Attempts to use sublimation processes with fractional condensation have also been made. These processes produced an end product which, while freed of certain components, still is not absolutely pure.

Attempts have also been made to accomplish the re-crystallization of, for example, raw terephthalic acids from dimethyl formamide. With this process, however, the yield as regards the pure end products obtained is extremely low since, due to chemical reaction involved therein, more than 30% of the terephthalic acid used is usually lost. A further disadvantage in this method is the fact that the terephthalic acids so crystallized, insofar as they contain nitrogen compounds derived from the nitric acid oxidation, are not absolutely free of nitrogen.

Since, for example, with the terephthalic acid production, in addition to the isomeric toluic acids and the by-products containing nitrogen, isophthalic acid may also occur as an impurity or by-product, the purified terephthalic acid cannot be characterized, as regards the purity thereof, merely by an indication of the acid number, but the examination for purity must also relate to the content in isomeric phthalic acids which possess the same characteristic values as the terephthalic acids.

None of the known and proposed purification methods, especially for terephthalic acid, can be regarded as a universal purification method and it may be readily determined that all known methods treat only a portion of the complex problem of purification and separation of aromatic carboxylic acids. These processes, therefore, never lead to a completely satisfactory solution of the problem of purifying terephthalic acid.

It has now been discovered that raw aromatic carboxylic acids, especially raw terephthalic acids or mixtures of raw phthalic acids, may be freed of impurities and separated from one another if the purification or purification and separation is undertaken by way of the ammonium salts of these acids in the presence of mixtures of dimethyl formamide and water.

According to the method of the present invention, for example, all by-products or intermediate products may be removed from terephthalic acids which are made by oxidation of commercial p-xylene by means of air or nitric acid, even when the terephthalic acid has an isophthalic acid content of between 20 to 45%.

In accordance with the present invention, the raw acids or raw acid mixtures are suspended in a water-dimethyl formamide mixture and subsequently, under stirring and possibly heating, preferably to temperautres of between 90 to 100° C., ammonia in the form of ammonia gas is introduced for such length of time until a clear or essentially clear solution results. Ammonium hydroxide is also usable, if preferred. Depending on quality and origin of the utilized raw acids, the solution has from a slight to a strong yellow coloring. The clear solution so obtained is filtered hot, using a filter aid, for example, activated charcoal. A completely water-clear solution is obtained thereby. From this solution there is distilled off, while stirring and possibly under use of a vacuum, so much water that 75 to 100% water, in relation to the utilized quantity of dimethyl formamide, remains in the distillation vessel. During the distillation, approximately 80 to 90% of the quantity of terephthalic acid present in the solution crystallizes as pure diammonium terephthalate.

Impurities which could not be separated by the filtration such as isophthalic acid, o-phthalic, p-toluic, benzoic acid and any aliphatic carboxylic acids present remain dissolved as ammonium salts in the filtrate.

If in connection with the purification of the aforementioned acids, quantities of impurities are considered which exceed the order of magnitude of common impurities, then the filtrate may be prepared and the individual acids may be separated from each other and obtained in the form of the ammonium salts thereof, or, after saponification, as pure acids.

Advantageous, and in no way disadvantageous for the purification method of the present invention, is the further utilization of the filtrate for the preparation of the next batch of acid which is to be purified in accordance with the present invention. In these cases, the distillate is reunited appropriately with the filtrate as an unobjectionable separation of water without the presence of dimethyl formamide is only possible over very well operating towers.

The quantities of dimethyl formamide and water to be used according to the present invention in the purification of, for example, terephthalic acids, are dependent upon the composition of the substances to be purified, the impurities present, and on the concentration of the ammonium salt produced. For example, the higher the percentage of the terephthalic acid the greater the ratio has to be displaced in the direction of water quantity. For the purification of, for example, a 90% terephthalic acid, a ratio of raw acid:dimethyl formamide:water equal to 1:2.5:7.5 may be indicated as guide line. In an industrial utilization of the method in accordance with the present invention, this ratio will be oriented correspondingly to the acid being purified and an adaptation with respect to the main impurities will be undertaken.

If the method according to the present invention is used in the treatment of, for example, raw terephthalic acids without the presence of dimethyl formamide exclusively in a watery solution, then one obtains a quantity of crystallized diammonium terephthalate only after very lengthy and difficult concentration of the watery solution. Also, the crystallized salt indicates with respect to its color a purification effect on the acid, but the salt still contains impurities.

Also, with the method for purifying terephthalic acids by way of the ammonium salts thereof in a watery solution, a pure product is obtained only if a very pure starting acid is used. In contradistinction thereto, the method in accordance with the present invention is particularly suited for the purification of terephthalic acids derived from the air or nitric acid oxidation process of commercial p-xylene which contain a large number of different substances, including toluic and phthalic acids, as both impurities and by-products. These substances could not be removed to the present date in a single step due to the chemical characteristics thereof.

The ammonium salts of aromatic carboxylic acids produced in accordance with the process of the present invention, especially the di-ammonium salts of phthalic acids, may be used directly for many purposes. The di-ammonium salt of terephthalic acid gained by treatment according to the present invention may, for example, be reacted directly with ethylene glycol and the product obtained thereby poly-condensed.

By decomposition of the di-ammonium salt of terephthalic acid with mineral acids, one obtains an extremely pure terephthalic acid which not only exhibits the calculated saponification number but also produces after esterification thereof with methanol an extremely pure terephthalic acid dimethyl ester. This dimethyl ester corresponds to the specifications required of the terephthalic acid dimethyl esters used for poly-ester manufacture.

The following examples serve to further illustrate the present invention without, however, limiting the same.

*Example 1*

80 g. of a commercially available terephthalic acid having a nitrogen content of 0.2% are suspended in a mixture of 200 dimethyl formamide and 600 ccm. of water. During stirring and heating to 98° C., ammonia gas is introduced with a velocity of 0.25 liter per minute. As soon as the required quantity of ammonia is introduced, a slightly cloudy, intensely yellow colored solution results. After the addition of active charcoal, hot filtering takes place. Thereafter, water is distilled off from the clear filtrate during stirring under normal pressure and return flow of approximately 1:5. During the distillation a well crystallized precipitation product forms which can be readily filtered off. This product is diammonium terephthalate.

By the decomposition of the ammonium salt in a watery solution with diluted salt acid, washing of the precipitated terephthalic acid and drying, one obtains a finely crystallized terephthalic acid which contains no longer even a trace of nitrogen. Esterification of this acid with methanol produces a terephthalic acid dimethyl ester having a melting point of 140.62° C.

*Example 2*

75 g. of terephthalic acid with a saponification number of 642 (theoretical: 676) produced by the air oxidation of a 98% p-xylene and having a by-product content determined analytically of 13.4% were suspended in a mixture of 200 g. dimethyl formamide and 700 ccm. of water. During stirring and heating to 90° C., ammonia was introduced with a velocity of 0.4 liter per minute until the suspension changed into an almost clear, slightly colored solution. Thereupon hot filtering took place by way of active charcoal plus fuller's earth in a ratio of 2:0.5. Altogether 3%, calculated according to the weight of the utilized terephthalic acid, of charcoal and fuller's earth were used. 600 ccm. were distilled off from the clear solution in vacuum through a column. The distillate contains approximately 10% dimethyl formamide. The finely crystallized precipitation product was sucked off from the distillation residue, washed with a dimethyl formamide water mixture in a ratio of 2:1 and subsequently with a methanol/ether mixture in a ratio of 2:1 and dried. The following characteristic numbers were found:

Saponification No. 560; 560.4 (calculated: 560)
Nitrogen 14.08% (calculated: 14%)

The yield in ammonium terephthalate amounted to 71.5 g. This represents 91% of the quantity to be expected theoretically. The terephthalic acids obtained by decomposition of the salt produced, after esterification with methanol, a terephthalic acid dimethyl ester with a melting point of 140.63° C. This ester also corresponded to all other requirements for dimethyl terephthalate used in poly-ester fiber manufacture.

Examination of the filtrate including the washing liquids indicated the presence of traces of metal salts (cobalt, iron) and terephthalic acid, isophthalic acid, terephthalic aldehyde acid, m-p-toluic acid and unknown substances.

*Example 3*

Ammonia was introduced into a suspension prepared in accordance with Example 2 at the same rate as in Example 2. Excess water, however, was not distilled off but instead slowly, while stirring, hot dimethyl formamide (85° C.) was added. After 300 g. of dimethyl formamide were added, the solution was cooled during further stirring. A crystalline precipitation was thus obtained which was drawn off and finished in the manner described in Example 2. 49 g. of ammonium terephthalate equal to 62.8% of the theoretically expected quantity was isolated in this manner.

*Example 4*

100 g. of a crude acid mixture which contained the following composition:

| | Percent |
|---|---|
| Terephthalic acid | 65 |
| Isophthalic acid | 27 |
| p-Toluic acid | 5 |
| m-Toluic acid and other compounds | 3 | were suspended in 350 g. dimethyl formamide and 950 ccm. of water.

During stirring and heating to 98° C., ammonia was introduced with a velocity of 0.5 liter per minute until a slightly cloudy solution resulted. Thereupon hot sucking-off took place by way of active charcoal with the simultaneous distillation of water. A crystalline precipitation forms which after drawing off, washing and drying produces a weight of 25.6 g. The characteristic numbers correspond to pure ammonium terephthalate.

Saponification No. 560 (calculated: 560)
Nitrogen 14.04% (calculated: 14%)

The yield amounts to 32.6% of the quantity to be theoretically expected. After step-wise distillation there is obtained as a second quantity, in finely crystalline form, 28.2 g. of ammonium terephthalate, equal to 36% in the same purity as the preceding first quantity. After further concentration crystals precipitate which no longer exhibit the high degree of purity of the first precipitations. It is, therefore, appropriate to return the second filtrate to the initial stages of the process in a closed circuit. The mother liquor is prepared in a manner depending on the content in isophthalic and toluic acid separately by way of the methyl ester.

The above examples serve to illustrate the process according to my invention, but do not limit the same. My new and novel process may be used to purify acids other than terephthalic and isophthalic acids in an analogous manner. This is feasible due to fractional precipitation. For other acids, the ratio of dimethyl formamide to water must be changed in accordance with established procedures as recognized by one skilled in the art.

By the use of heat exchanger installations and continuous operation the process may be advantageously formulated in an extremely economical manner.

I claim:

1. A process for the recovery of a substantially pure ammonium salt of terephthalic acid from an impure terephthalic acid prepared by the oxidation of p-xylene with an agent selected from the group consisting of air and nitric acid which comprises suspending the impure acid in a mixture of dimethyl formamide and water, adding sufficient ammonia to the suspension to neutralize the suspended acid and form a solution, precipitating the ammonia salt of terephthalic acid from the solution formed by increasing the ratio of dimethyl formamide to water in said solution, and separating the precipitated ammonium salt from the solution.

2. A process according to claim 1 in which the ammonia is added in the form of ammonia gas.

3. A process according to claim 1 in which the ammonia is added in the form of ammonium hydroxide.

4. A process according to claim 1 in which precipitation is effected by distillation of a portion of the water.

5. A process according to claim 1 in which precipitation is effected by the addition of dimethyl formamide.

6. A process according to claim 1 in which the precipitated ammonium salt is separated by filtration.

7. A process according to claim 1 in which the suspension is heated to a temperature in the range of about 90 to 100° C. during the addition of ammonia.

References Cited by the Examiner

UNITED STATES PATENTS

| | | | |
|---|---|---|---|
| 2,794,831 | 6/57 | McKinnis | 260—525 |
| 2,811,548 | 10/57 | Ham et al. | 260—525 |
| 2,862,963 | 12/58 | Fuchs et al. | 260—525 |
| 2,897,232 | 7/59 | O'Brien | 260—525 |

References Cited by the Applicant

UNITED STATES PATENTS 3,123,632  3/64  Katzschmann.

LORRAINE A. WEINBERGER, *Primary Examiner.*

LEON ZITVER, *Examiner.*